Figure 1:
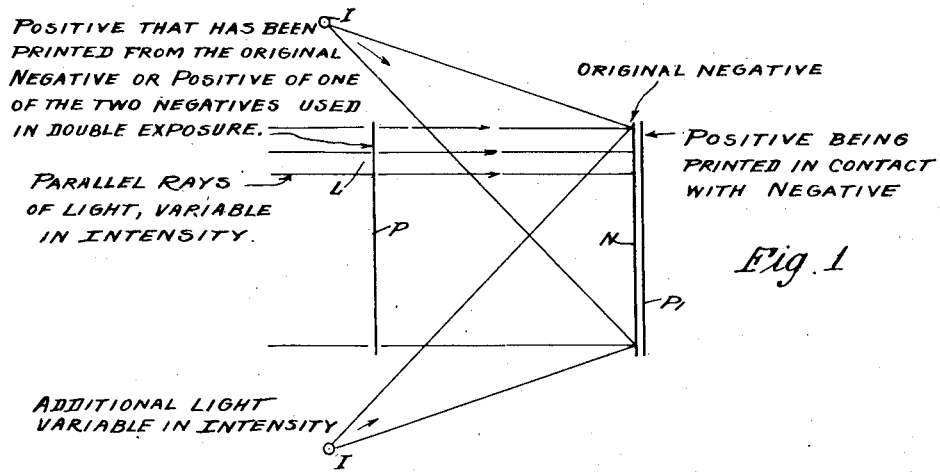

June 9, 1931. J. T. BARKELEW 1,808,743
METHOD OF MODIFYING PHOTOGRAPHS BY PRINTING
Filed July 6, 1926 2 Sheets-Sheet 1

Inventor

June 9, 1931. J. T. BARKELEW 1,808,743
METHOD OF MODIFYING PHOTOGRAPHS BY PRINTING
Filed July 6, 1926 2 Sheets-Sheet 2

Inventor

Patented June 9, 1931

1,808,743

UNITED STATES PATENT OFFICE

JAMES T. BARKELEW, OF LAMANDA PARK, CALIFORNIA, ASSIGNOR, BY MESNE ASSIGNMENTS, TO PARAMOUNT PUBLIX CORPORATION, A CORPORATION OF NEW YORK

METHOD OF MODIFYING PHOTOGRAPHS BY PRINTING

Application filed July 6, 1926. Serial No. 120,561.

This invention has to do with the modification of photographs by printing. Heretofore certain methods have been practiced for modifying negatives or positives where certain parts of such negatives or positives might be too opaque or too transparent, or where in general there is too much contrast in certain parts of such a negative or positive. It very often happens in a photographed scene that, for instance due to deficiencies of a photographic film in representing color values, certain parts of the film will be either too transparent or too opaque, making a far greater contrast in the picture than was present to the eye in the original scene. It has been known that a translucent screen may be prepared by distributing a light absorbing substance over certain parts, so that when a negative, for instance, is illuminated through the screen the amount of light transmitted through certain portions of the negative will be materially cut down; with the result that the corresponding part in the positive printed from such negative will relatively be lighter or more transparent than would otherwise be the case. And substantially the same results have been reached by illuminating the negative in a projection printer by light reflected from some suitable reflective surface, the reflective surface being modified by hand so that its reflectivity is changed in certain portions in correspondence with portions of the negative which it is wished to modify in the printer.

However, these methods are defective particularly in that they involve hand work, and as is readily apparent such methods are not applicable easily to moving objects in motion picture film because a separate translucent screen or reflective surface will have to be prepared for each frame of a motion picture film.

It is an object of this invention to provide a method whereby such results may be obtained without the necessity of hand work. While of course the invention has its major value in connection with modified printing of motion picture film, it is not necessarily limited to motion picture film, as will be readily recognized. The invention depends for its effective results on the fact that a negative and a corresponding positive, if placed together in register, will form an almost uniform ground, the relatively transparent and opaque parts of such a negative and positive complementing each other more or less closely. The print taken through the superimposed negative and positive will show usually a uniform gray tone. If, for instance, there is in a negative a certain part that is too transparent, the corresponding part of the positive will be too opaque, and vice versa. By using corresponding negatives and positives for the purpose of correcting a print taken from one or the other, this invention provides modified printing results without the necessity of hand work.

Although in the following detailed specification I speak more particularly of printing a modified positive from an original negative, using a corresponding positive for that purpose, it will be understood that a modified negative may be printed from a positive in similar manner, using a corresponding negative to obtain the modification results. In the purposes of the appended claims, a positive may be considered a "negative" of a negative, as well as a negative may be considered a negative of a positive.

In the accompanying drawings Figs. 1 to 5 inclusive are diagrams representing variations of the method.

Referring first to Fig. 1 of the drawings, there is shown an original negative N and a modified positive P¹ being printed from the original negative by the contact method. At P is indicated the positive that corresponds with negative N, for instance a positive that has been printed in the ordinary manner from negative N. In the method shown in Fig. 1 positive P is spaced a suitable distance from negative N, and the light which falls on negative N from positive P is light that is transmitted through positive P in parallel lines as indicated at L. Thus, for instance, the light that traverses a relatively opaque part of positive P will fall exclusively upon the relatively transparent part of negative N. The light used for illuminating positive P will preferably be variable in intensity.

Likewise the lights, such as indicated at I, used for independently illuminating negative N will also be variable in intensity.

Now, if negative N were illuminated wholly by light transmitted from positive P, the result would be, generally speaking, a practically uniform beam of light passing through negative N and the result on positive $P^1$ would be a uniform gray tone because the positive cuts out light at any given point just in proportion as the negative passes light at the corresponding point. Consequently if negative N were illuminated entirely by light passing through positive P the final print would be toned down to a simple and uniform drab. On the other hand, if negative N were totally illuminated by the light independent of positive P, then a positive would be obtained at $P^1$ that would still have the undesired contrasts. By making the lighting a combination of these two extremes a modification of the final print is obtained. By providing a variable light illuminating or passing through positive P and also providing independent variable light that directly illuminates negative N, any desired amount of toning down can be gotten; and in the case of "double exposure" such modification can be confined entirely to either part of the complete scene. Thus if the action in a double exposure scene is too light or too dark, that part can be modified as desired by using at P, for instance, a print of the original action negative.

If it is desired to obtain modification other than those obtainable by relative variation of the two illuminations of negative N, such modification may be obtained for instance by either illuminating the negative or positive P with a light that varies over the surface of the negative or positive instead of being uniform over their surfaces. For instance, if there is only one particular part of negative N that needs modification, and that part is one that in the negative is too dense, then the light that is transmitted through positive P may be controlled so that it is most intense in those relatively transparent parts that correspond to the dense part or parts of negative N. In other words, the methods now known may, if desired, be used in conjunction with my method.

Further variation of modification may be obtained by controlling the precedent printing of positive P from negative N. It will be readily understood that relatively light or dense positives used at P will give different results in the modification procedure from the results gotten from a positive P that may be said to correspond, in its variations of transparency and opacity, exactly with the original negative N.

Figure 2:
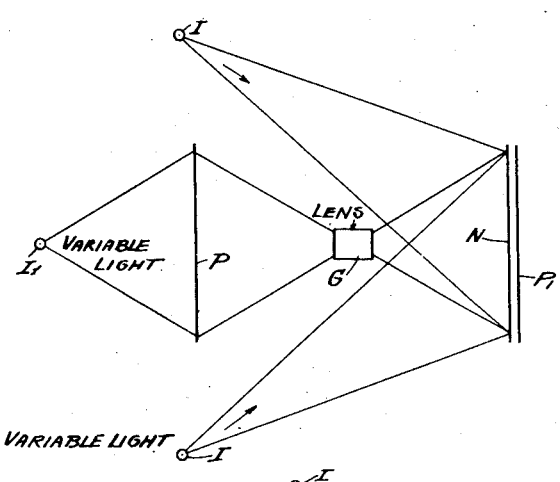
Figure 3:
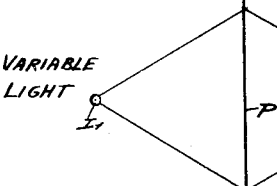
Figure 3:
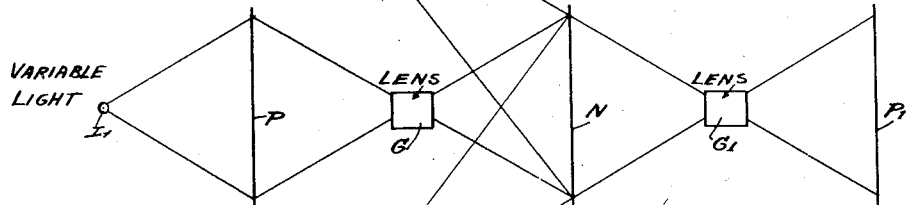

In Fig. 2 a projection lens G is spaced between positive P and negative N. By using a projection lens in this position positive P need not be illuminated with parallel light, but may be illuminated in any suitable manner from the variable light $I^1$, the lens G throwing an image of positive P onto negative N. Fig. 2 shows the final positive $P^1$ being printed in contact with negative N, but on the other hand, in Fig. 3, the positive $P^1$ is shown as being printed by projection through lens $G^1$ from negative N illuminated by its independent variable lights I and also illuminated by an image from positive P cast by lens G.

Figure 4:
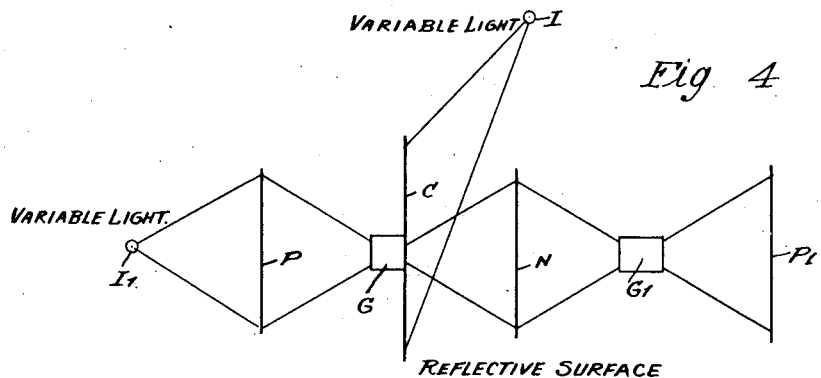

Fig. 4 shows a variation of the method of illuminating negative N. Here the illuminant I instead of casting light directly on negative N is made to illuminate a suitable reflective card C placed between positive P and negative N. It may be placed so that it surrounds or is close to lens G. And by illuminating such a reflective surface for the illumination of negative N, independently of positive P, it is possible by suitably locally modifying the reflectivity of surface C to obtain further modifications in the final print obtained on positive $P^1$.

Figure 5:
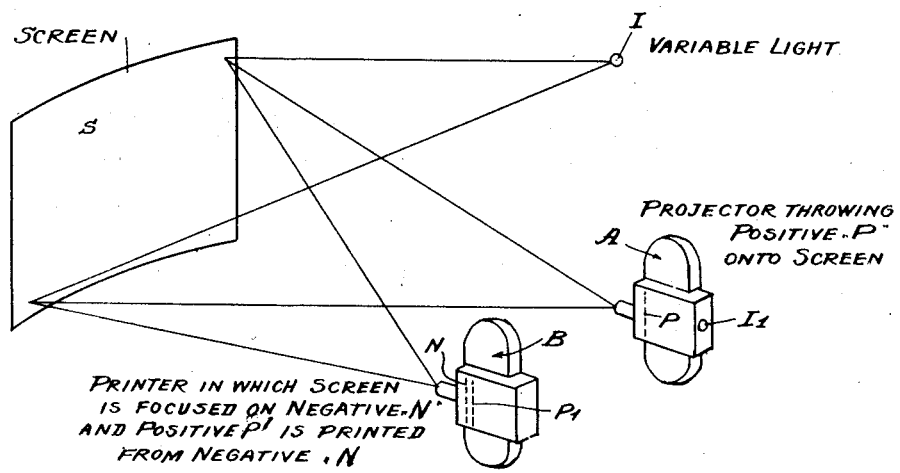

Further, as shown in Fig. 5, a suitable reflective surface or screen S may be used and a projector A may be used to project positive P onto the screen. The illumination in this projector will preferably be variable. Then positive $P^1$ will be placed in or run through a camera printer B in which the positive $P^1$ is arranged behind the original negative N with the printer focusing the screen image on negative N. Negative N thus, just as before, obtains a certain amount of illumination from the positive P. The independent variable illumination of negative N may then be provided by a variable illuminant I which casts onto screen S either a uniform or a locally varied light; and as before explained, the relative intensities of the two independent illuminations of negative N, or the localized variations in either one or both of those relative intensities, will control the nature of modification finally obtained upon positive $P^1$. In fact the results obtained and the general method followed in the form of Fig. 5 is the same as in the other arrangements and is subject to the same controls and variations, the only difference lying in the particular manner in which light is gotten to the negative from the variable illuminant I and from the positive P.

In order to avoid distortion between the projector and the camera printer due to their different angles relative to the screen they should be arranged at some distance from the screen and close together, or closely in line. And for this purpose it will of course be well understood that such camera printer and projector may be made into one single piece of apparatus, with their lenses and films arranged in close proximity so as to minimize the difference in angle relative to the screen. Or, to take care of such distortions due to differences in angles the screen may be somewhat curved, as is illustrated in Fig. 5, so as to compensate either wholly or substantially wholly for any such distortion as would take place if a flat screen were used.

I claim:

1. The method of printing a modified positive from a negative, that includes placing an actinic film in printing relationship to the negative, illuminating the negative from one source of illumination, illuminating the negative independently from another source of illumination, and modifying the illumination from one of the sources by interposing a transparent positive of the negative between the source of illumination and the negative and in registration with the negative so that the light rays from the latter source pass through the positive to print the negative.

2. The method of printing a modified positive from a negative, that includes placing an actinic film in printing relationship to the negative, illuminating the negative from one source of illumination, illuminating the negative independently from another source of illumination, modifying the illumination from one of the sources by interposing a transparent positive of the negative between the source of illumination and the negative and in registration with the negative so that the light rays from the latter source pass through the positive to print the negative, and controllably relatively varying the intensity of the two said illuminations.

In witness that I claim the foregoing I have hereunto subscribed my name this sixteenth day of June, 1926.

JAMES T. BARKELEW.